F. C. KOLLATH

ELECTRIC CONNECTER

Sept. 15, 1931.

Original Filed Sept. 27, 1927

Re. 18,193

Inventor:
Francis C. Kollath.

By
Chester E. Warner.
Atty.

Reissued Sept. 15, 1931 Re. 18,193

UNITED STATES PATENT OFFICE

FRANCIS C. KOLLATH, OF CHICAGO, ILLINOIS, ASSIGNOR OF ONE-HALF TO DANIEL WOODHEAD, OF DETROIT, MICHIGAN

ELECTRIC CONNECTER

Original No. 1,743,821, dated January 14, 1930, Serial No. 222,229, filed September 27, 1927. Application for reissue filed March 6, 1931. Serial No. 520,655.

This invention relates to electric connecters, and more especially to that class of heavy duty connecters, or so-called attachment plugs used on extension cords in connection with portable machine tools. The electrical connection is usually made to the power line by inserting the plug in a wall receptacle provided for the purpose, and is accomplished by a straight in push of the plug and disconnected by a straight out pull.

One of the objects of the invention is to provide a connecter for a plurality of conductors and in which one or all of the connecters may be fused, and in which the fuses are supported in the connecter and are readily accessible for insertion and removal without disassembling the connecter.

Another object is to provide an electric connecter which has a flexible rubber casing clampingly engaging a base member, the base member having a fuse mounted thereon for electrically connecting a conductor to a contact prong.

A further object is to provide a new and novel electric connecter for electrically connecting a power device or tool with the electric circuit so that a short circuit or an overload will blow out a fuse arranged in the connecter casing and prevent fuses on the main circuit from being blown, thus rendering only the device inoperative without affecting other tools, devices, or lights common to the circuit.

A still further object is to provide an improved electric connecter which is made of few, simple parts, which may be quickly and easily assembled and taken apart, and which may be readily and economically manufactured.

Numerous other objects and advantages will be apparent throughout the progress of the following specification.

The invention comprises in general, a relatively long hollow flexible rubber casing in which a supporting base member is arranged. Electric conductors pass through an end opening in the casing and are electrically connected to contact prongs which are carried by the supporting base and extend a suitable distance beyond the opposite end of the casing. A fuse may be electrically arranged between the end of one or more of the conductors and the prongs whereby an overload on a device or tool to which the connecter is connected will be rendered inoperable without affecting other tools, devices or lamps on the same power circuit. The rubber casing is flexible and may be stretched or distorted within reasonable limits to permit assembly of the connecter. The rubber flexible casing forms a buffer or shock proofing agent to protect the elements arranged in the casing. This casing also clampingly engages the base member and assists in holding the base member and its cooperating parts and connections in proper operable relationship and position. An outer shell may be provided for protecting the contact prongs from becoming damaged or sprung should the connecter be dropped or otherwise roughly handled. When this latter shell is employed, a cooperating electrical connection or receptacle is provided with a complementary socket or groove to receive the forwardly extending shell. A clamping ring may be arranged about the outside of the casing to assist in supporting the various parts and elements in proper position in the casing.

The accompanying drawings illustrate a selected embodiment of the invention and the views therein are as follows.

Figure 1:
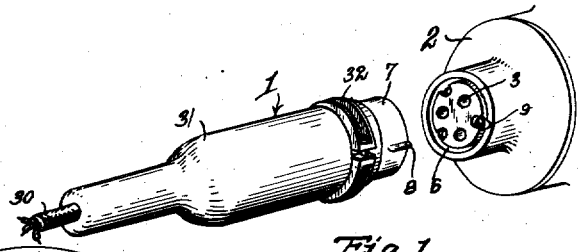
Fig. 1 is a perspective view of the improved connecter or plug in combination with its cooperating receptacle.
Figure 2:
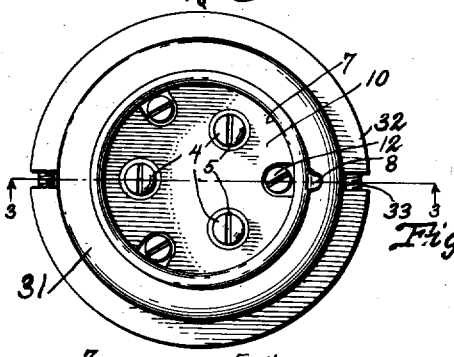
Fig. 2 is an end view of the connecter or plug.
Figure 3:
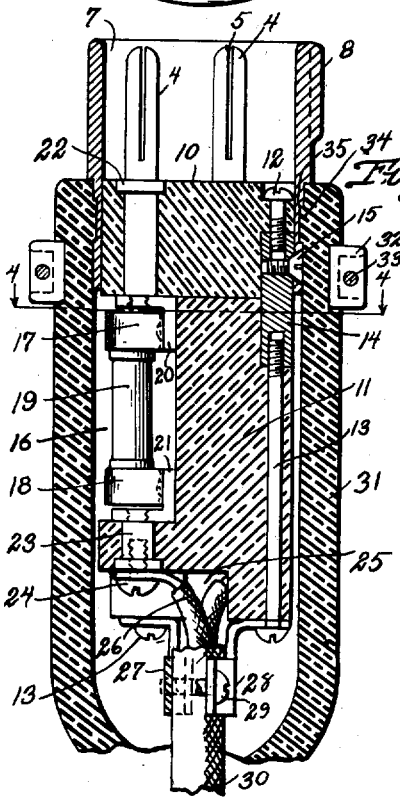
Fig. 3 is a detail longitudinal sectional view on the line 3—3 of Fig. 2.
Figure 4:
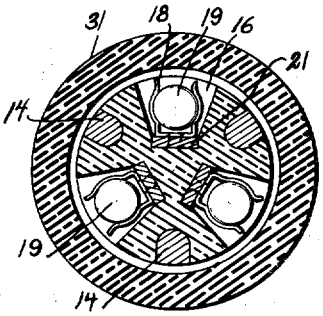
Fig. 4 is a transverse sectional view on the line 4—4 of Fig. 3, and is shown rotated anti-clockwise thirty degrees from the position shown in Fig. 3.

Referring to the drawings, 1 designates a plug or connecter which is adapted to cooperate with the receptacle 2 which is provided with sockets 3 to receive the connecter pins or contact prongs 4. The pins or prongs 4 make suitable electrical connection with the power line and they may be split as shown at 5 to provide frictional contact.

The receptacle 2 may be provided with an annular groove 6 to receive a cylindrical housing or shell 7 in which the pins are supported. This shell or housing may be a part of the base or a separate member, as shown, and protects the pins from damage when the connecter is not in the receptacle and assists in supporting the connecter in the receptacle. A lug 8 on the housing or shell cooperates with a notch 9 in the receptacle to maintain the alignment of the pins with their respective sockets.

In the present instance a three pole plug has been shown, but it is evident that any number desired may be used.

The plug or connecter proper comprises two insulating bases 10 and 11, which are secured together by means of the screws 12 and 13 and the members 14 into which the screws are threaded. The housing or shell 7 may be also supported on the members 14 by screws 15.

The base 11 is provided with radial slots or depressions 16 in which fuse clips 17 and 18, for supporting the fuses 19, are arranged. The clips may be secured to angle members 20 and 21, as shown. The angle members 20 are secured rigidly to the base 10 by means of the pins 4 which are threaded into them, the pins being provided with a shoulder 22 for engagement with the base 10. The angle members 21 may be secured in a similar manner to the base 11 by means of members 23 which are internally threaded to receive binding screws 24. The binding screws may be arranged in depressions 25 in the rear of the base 11 and are adapted to receive the conductors 26.

A strain relief member is provided for preventing a pulling strain on the conductors from being transmitted to connections. This strain relief comprises members or parts 27 and 28 which may be fastened to the base member 11 by means of the screws 13. Screws 29 may be provided for connecting the two parts together for clampingly engaging the cable 30.

A casing 31 which is preferably made of flexible resilient rubber material provides a closure for the base member and its cooperating elements, parts, and connections. This casing stretches within reasonable limits to permit insertion or withdrawal of the base member. The casing clampingly engages the base member and tends to hold the parts in assembled relationship and due to its flexibility, permits it to be stretched to remove the base. To further maintain the parts within the casing, a clamping ring 32, secured in position by screws 33, may be arranged exteriorly of the casing as clearly shown in the drawing. The casing is relatively long to provide a handle for the connecter.

The casing 31 may also be provided with an internal ring or collar 34 which engages a complementary groove 35 in the housing or shell 7.

It will be noted that when the casing 31 is removed the fuses are readily accessible and may be easily inserted and removed.

While the device, as illustrated in the drawings, shows a two part insulating base, it will be understood that it may be made in a single piece if desired, and that instead of having three contact prongs, as shown, a greater or less number may be used.

Figure 5:
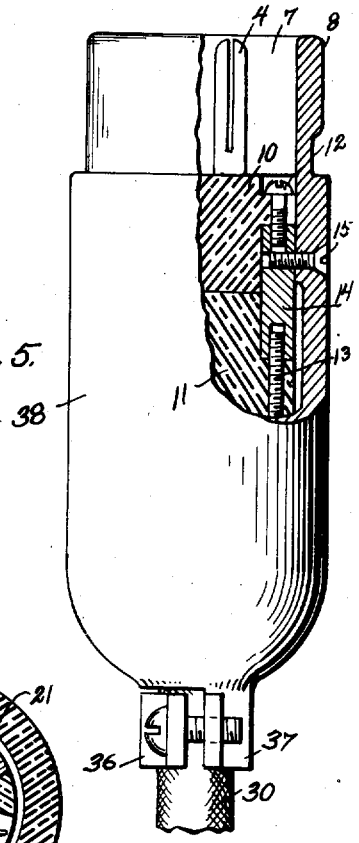
Fig. 5 shows a modified form of combined housing and casing.

In Fig. 5 a modified structure is shown with the shell or housing 7 formed integral with the casing. A strain relief or cord grip, comprising the parts 36 and 37, is formed as a part of the casing 38 which in the modified form is made of metal or other suitable insulating material. However, the use of the flexible, resilient rubber casing and handle 31 is preferred over the construction shown in Fig. 5, the modification being solely for the purpose of showing another way in which a protecting shell or housing for the prongs may be constructed.

Changes may be made in the form, construction, and arrangement of the parts without departing from the spirit of the invention or sacrificing any of its advantages, and the right is hereby reserved to make all changes as fairly fall within the scope of the following claims.

The invention is hereby claimed as follows:

1. An insulating base having electrical conductors therethrough, one end of said conductors terminating in electrical connecters, removable fuses in said base and forming a part of said conductors, a forwardly extending shield around said connecters and mounted on said base, a flexible and resilient rubberlike casing around said base and extending over said shield, and means for removably securing said casing to said shield.

2. An electrical connecter comprising an upper insulating base, and a lower insulating base, a plurality of radially spaced conductors extending through said bases and terminating in connecters, means radially spaced between said conductors for securing said bases together, a cord grip supported on said securing means, a forwardly extending connecter shield also supported on said securing means, and a flexible rubberlike casing around said bases and removably secured to said shield.

3. An electrical connecter comprising an upper insulating base, and a lower insulating base, a plurality of radially spaced conductors extending through said bases and terminating at one end in connecters, fuses in said conductors and removable from the side of one of said bases, means radially spaced between said conductors for securing said bases together, a cord grip supported on said securing means, and a flexible and resilient rubberlike casing around said bases and removably secured to said shield.

4. An electrical connecter comprising an upper insulating base, and a lower insulating base, a plurality of radially spaced conductors extending through said bases and terminating at one end in electrical connecters and at the other end in binding terminals, radially spaced securing members between said bases, means securing said upper base to said securing member, means securing said lower base to said securing member, a cord grip supported on said last named means, a connecter shield around said connecters and secured to said securing members, and a casing around said bases.

5. In combination, an electric connecter having outwardly extending contact prongs, a shell arranged about said prongs, and a receptacle for said connecter, said receptacle having a complementary recess for receiving said shell.

6. An electric connecter comprising a base member, a flexible rubber casing receiving said base member and clampingly engaging said base member, contact prongs operatively supported by said base and extending a predetermined distance beyond the end of said casing, conductors operatively connected to said prongs, a fuse operatively arranged between a prong and a conductor, and a strain relief member connected to said base member and clampingly engaging the conductors.

7. An electric connecter comprising a base member, a flexible rubber casing receiving said base member and clampingly engaging said base member, contact prongs operatively supported by said base and extending a predetermined distance beyond the end of said casing, conductors operatively connected to said prongs, a fuse operatively arranged between a prong and a conductor, and a housing extending beyond the end of said casing and providing protection for said contact prongs.

8. An electric connecter comprising a base member, a flexible rubber casing receiving said base member and clampingly engaging said base member, contact prongs operatively supported by said base and extending a predetermined distance beyond the end of said casing, conductors operatively connected to said prongs, a fuse operatively arranged between a prong and a conductor, a strain relief member connected to said base member and clampingly engaging the conductors, and a housing extending beyond the end of said casing and providing protection for said contact prongs.

9. An electric connecter comprising a base member, a flexible rubber casing surrounding said base member and causing the base member to be clampingly supported in the casing, contact prongs extending from said base member and beyond the end of the rubber casing, electrical conductors extending into said casing and operatively and electrically connected to said prongs, and a fuse operatively and electrically arranged between at least one of said prongs and an end of a conductor.

10. An electric connecter comprising a base member, a flexible rubber casing surrounding said base member and causing the base member to be clampingly supported in the casing, contact prongs extending from said base member and beyond the end of the rubber casing, electrical conductors extending into said casing and operatively and electrically connected to said prongs, a fuse operatively and electrically arranged between at least one of said prongs and an end of a conductor, and a strain relief member arranged inside of said casing and connected to the base member and clampingly engaging the conductors for preventing any strain on said conductors to be transmitted to electrical connections inside of the casing.

11. An electric connecter comprising a base member, a flexible rubber casing surrounding said base member and causing the base member to be clampingly supported in the casing, contact prongs extending from said base member and beyond the end of the rubber casing, electrical conductors extending into said casing and operatively and electrically connected to said prongs, a fuse operatively and electrically arranged between at least one of said prongs and an end of a conductor, and a housing extending beyond the casing and protecting the conductors.

12. An electric connecter comprising a base member, a flexible rubber casing surrounding said base member and causing the base member to be clampingly supported in the casing, contact prongs extending from said base member and beyond the end of the rubber casing, electrical conductors extending into said casing and operatively and electrically connected to said prongs, a fuse operatively and electrically arranged between at least one of said prongs and an end of a conductor, a strain relief member arranged inside of said casing and connected to the base member and clampingly engaging the conductors for preventing any strain on said conductors to be transmitted to electrical connections inside of the casing, and a housing extending beyond the casing and protecting the conductors.

FRANCIS C. KOLLATH.

CERTIFICATE OF CORRECTION.

Reissue Patent No. 18,193. Granted September 15, 1931, to

FRANCIS C. KOLLATH.

It is hereby certified that the residence of the assignee of the one-half interest in the above numbered patent was erroneously written and printed as "Detroit, Michigan", whereas said residence should have been written and printed as Evanston, Illinois, as shown by the records of assignments in this office; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.